US009423983B2

(12) United States Patent
Liu

(10) Patent No.: US 9,423,983 B2
(45) Date of Patent: Aug. 23, 2016

(54) INTELLIGENT STORAGE CONTROLLER

(75) Inventor: Peter Chi-Hsiung Liu, Paramus, NJ (US)

(73) Assignee: Syncsort Incorporated, Woodcliff Lake, NJ (US)

( * ) Notice: Subject to any disclaimer, the term of this patent is extended or adjusted under 35 U.S.C. 154(b) by 33 days.

(21) Appl. No.: 13/426,247

(22) Filed: Mar. 21, 2012

(65) Prior Publication Data
US 2013/0191555 A1 Jul. 25, 2013

(51) Int. Cl.
G06F 3/00 (2006.01)
G06F 9/00 (2006.01)
G06F 3/06 (2006.01)

(52) U.S. Cl.
CPC .............. G06F 3/0683 (2013.01); G06F 3/061 (2013.01); G06F 3/0638 (2013.01); *G06F 2206/1012* (2013.01)

(58) Field of Classification Search
None
See application file for complete search history.

(56) References Cited

U.S. PATENT DOCUMENTS

| 4,210,961 | A | 7/1980 | Whitlow |
| 5,519,860 | A | 5/1996 | Liu |
| 5,557,770 | A | 9/1996 | Bhide |
| 5,655,146 | A | 8/1997 | Baum |
| 5,671,406 | A | 9/1997 | Lubbers |
| 6,128,717 | A | 10/2000 | Harrison |
| 6,735,636 | B1 * | 5/2004 | Mokryn et al. ............... 710/5 |
| 6,823,398 | B1 * | 11/2004 | Lee et al. ..................... 710/5 |
| 7,069,385 | B2 | 6/2006 | Fujimoto |
| 7,080,051 | B1 * | 7/2006 | Crawford .................... 705/400 |
| 7,185,003 | B2 | 2/2007 | Bayliss |
| 7,240,059 | B2 | 7/2007 | Bayliss |
| 7,293,024 | B2 | 11/2007 | Bayliss |
| 7,529,752 | B2 | 5/2009 | Hinshaw |
| 7,571,280 | B2 | 8/2009 | Fujimoto |
| 7,577,667 | B2 | 8/2009 | Hinshaw |
| 7,634,477 | B2 | 12/2009 | Hinshaw |
| 7,668,840 | B2 | 2/2010 | Bayliss |
| 7,743,211 | B2 | 6/2010 | Fujimoto |
| 7,945,581 | B2 | 5/2011 | Bayliss |
| 8,090,711 | B2 | 1/2012 | Burger |
| 8,090,936 | B2 * | 1/2012 | Fallon et al. ................ 713/2 |
| 2002/0035664 | A1 * | 3/2002 | Yates et al. ................. 711/111 |

(Continued)

FOREIGN PATENT DOCUMENTS

| EP | 617358 A1 | 9/1994 |
| EP | 1533704 A2 | 5/2005 |

(Continued)

*Primary Examiner* — Michael Sun
(74) *Attorney, Agent, or Firm* — Lynn Russo

(57) ABSTRACT

An intelligent storage controller operating in conjunction with a computer running an application that uses the data managed by the intelligent storage controller, and requires data transformation operations to be performed on the data. The intelligent storage controller is adapted to directly perform the data transformation operations on the data controlled by the controller, under the direction of the computer running the application, thereby offloading this processing entirely to the intelligent storage controller. The intelligent storage controller may also provide an application programming interface for the computer running the application to use in directing commands to the intelligent storage controller. To accommodate varying workloads on the intelligent storage controller, data transformation tasks may be load balanced between the intelligent storage controller, the computer running the application, and/or other hosts.

5 Claims, 3 Drawing Sheets

(56) References Cited

U.S. PATENT DOCUMENTS

| | | | |
|---|---|---|---|
| 2002/0109718 A1* | 8/2002 | Mansour et al. | 345/744 |
| 2002/0118307 A1* | 8/2002 | Lee | 348/714 |
| 2004/0117358 A1* | 6/2004 | von Kaenel et al. | 707/3 |
| 2005/0114356 A1* | 5/2005 | Bhatti | 707/100 |
| 2006/0041702 A1* | 2/2006 | Greenberger | G06F 3/061 710/306 |
| 2007/0208694 A1 | 9/2007 | Bayliss | |
| 2009/0089794 A1 | 4/2009 | Hilton | |
| 2009/0164704 A1* | 6/2009 | Kanade et al. | 711/103 |
| 2010/0123745 A1* | 5/2010 | Nakaya | B41J 2/465 347/9 |
| 2011/0040771 A1 | 2/2011 | Gilyadov | |
| 2011/0137864 A1* | 6/2011 | Deshmukh et al. | 707/648 |
| 2011/0258406 A1* | 10/2011 | Suetsugu | G06F 3/0608 711/162 |
| 2012/0079003 A1* | 3/2012 | Somani et al. | 709/203 |
| 2012/0079175 A1* | 3/2012 | Flynn et al. | 711/103 |
| 2014/0344488 A1* | 11/2014 | Flynn | G06F 5/14 710/52 |

FOREIGN PATENT DOCUMENTS

| | | |
|---|---|---|
| EP | 2403202 A1 | 1/2012 |
| GA | 2275550 A | 8/1994 |
| WO | 2004027576 A2 | 4/2004 |
| WO | 2004027649 A1 | 4/2004 |
| WO | 2004027652 A1 | 4/2004 |
| WO | 2009043043 A1 | 4/2009 |
| WO | 2009153687 A1 | 12/2009 |
| WO | 2012001122 A1 | 1/2012 |

\* cited by examiner

INTELLIGENT STORAGE CONTROLLER

CROSS-REFERENCES TO RELATED APPLICATIONS

This application claims priority to Provisional Application Ser. No. 61/588,351, filed Jan. 19, 2012, and Provisional Application Ser. No. 61/590,851, filed Jan. 26, 2012, the entire disclosures of which are hereby incorporated by reference.

FIELD OF THE DISCLOSURE

This disclosure is in the field of information technology, and relates more particularly to an intelligent storage controller configured to be controllable to perform data transformation operations directly on data residing in physical storage managed by the intelligent storage controller.

BACKGROUND OF THE RELATED ART

The typical enterprise deploys a wide range of business systems. Such enterprises often use "data integration" technologies to pull together the information in such systems, to ensure that its decision-makers are working with a unified, current, consistent view of information from across the enterprise.

Data integration tools are often used to pool the data from these diverse systems to form "data warehouses," from which the data may be accessed in coherent formats and compilations. The data integration tools may then be used to reorganize the data in the data warehouse to provide a plurality of "data marts," each tailored to the needs of different classes of users in the enterprise (e.g., sales, finance, operations, human resources, etc.). Other operations in the enterprise, apart from data integration, may involve processing large volumes of data.

Data integration and other enterprise data processing often necessitates repeated operations involving "data transformation"—converting data from a source format and organization to a destination format and/or organization. Data transformation includes, for example, operations such as sorting data, aggregating the data by specified criteria, summing, averaging, or sampling the data, compressing, decompressing, encoding, decoding or otherwise manipulating the data, etc. Data transformation operations are often performed on large and sometimes enormous volumes of data, and commonly require a substantial portion of a computer's resources. Such operations can be a substantial portion of the overhead of a data integration or data processing process, and can be performance-critical. These requirements become more critical as enterprises develop larger systems and require tools to deal with what has become known as "big data"—the huge volumes of data that accumulate as a result of the automation of business processes by electronic commerce and telecommunications. Accordingly, there exists a growing need to provide more efficient tools for data transformation in order to achieve suitable performance with data integration and other large-scale applications.

Sorting is one example, which is representative in some respects, of the processing demands imposed by data transformation operations. A large sort job will often involve sorting a data set that is larger than will fit in the computer's memory at one time. Such a sort process is referred to as an "external sort," because work-in-process data developed during the sort job must be stored outside of the main memory of the computer, resulting in additional I/O. Techniques for reducing I/O and processing requirements during an external sort are described in references such as commonly assigned U.S. Pat. No. 4,210,961 to Whitlow, et al.

Conventionally, a sort process involves, in addition to other steps, a step of reading the data to be sorted from storage into the computer's memory and sorting the data, and a step of writing the sorted data to the designated output file on a storage unit. Further, in the case of an external sort, where the amount of data to be sorted is larger than the memory can hold, the sorting step will have to be re-performed in order to sort all of the data, and one or more merge steps may be required to merge the individually sorted portions into a single run in the correct order. Each of these steps, even when optimized in accordance with the current art, entails substantial CPU activity as well as the I/O of reading and writing the input file, the intermediate merge strings, and the output file.

Commonly assigned U.S. Pat. No. 5,519,860 disclosed a method of using the processing capabilities of intelligent secondary storage attached to a main computer in order to enhance the sorting process on the main computer. Rather than reading all of the data from storage and sorting it on the main computer, the '860 patent taught to read a sort key and a record storage location for each record to be sorted; sort a "skeleton" containing only the extracted data on the main computer; and then use the sorted record locators and the sort order derived on the main computer to instruct the intelligent controller to reorder the records in sorted order. In this way, the volume of data I/O between the main computer and the intelligent controller was reduced, and the work of physically reordering the data records was offloaded to the intelligent controller, thereby increasing the efficiency of the sorting process.

Nevertheless, under the approach developed in the commonly assigned '860 patent, it remained the case that the sort operation was still carried out by the main computer, and that the data I/O, though reduced, was not eliminated, because the keys and record pointers still had to be transferred to the main computer from the intelligent controller, the main computer still had to transfer the reordering instructions back to the intelligent controller, thereby leaving considerable processing volume for the main computer and its communications channels.

SUMMARY OF THE DISCLOSURE

This summary and the accompanying abstract are provided for summary purposes only.

In one embodiment, an intelligent storage controller is provided, fashioned to operate in conjunction with a computer running an application that uses the data managed by the intelligent storage controller. The intelligent storage controller includes processing capability, which is adapted to directly perform data transformation operations on data controlled by the controller. The intelligent storage controller is further adapted to operate under the direction of the computer running the application, through a service configured on the intelligent storage controller, and preferably responsive to an application programming interface provided by the intelligent storage controller. Thereby, the workload and bandwidth consumption of the data transformation operation may be entirely offloaded to the intelligent storage controller. To accommodate varying workloads on the intelligent storage controller, data transformation tasks may be load balanced between the intelligent storage controller, the computer running the application, and/or other hosts.

BRIEF DESCRIPTION OF THE DRAWINGS

The foregoing and other aspects and advantages of the disclosure will be better understood from the following detailed description, with reference to the drawings, in which.

DETAILED DESCRIPTION

Figure 1:
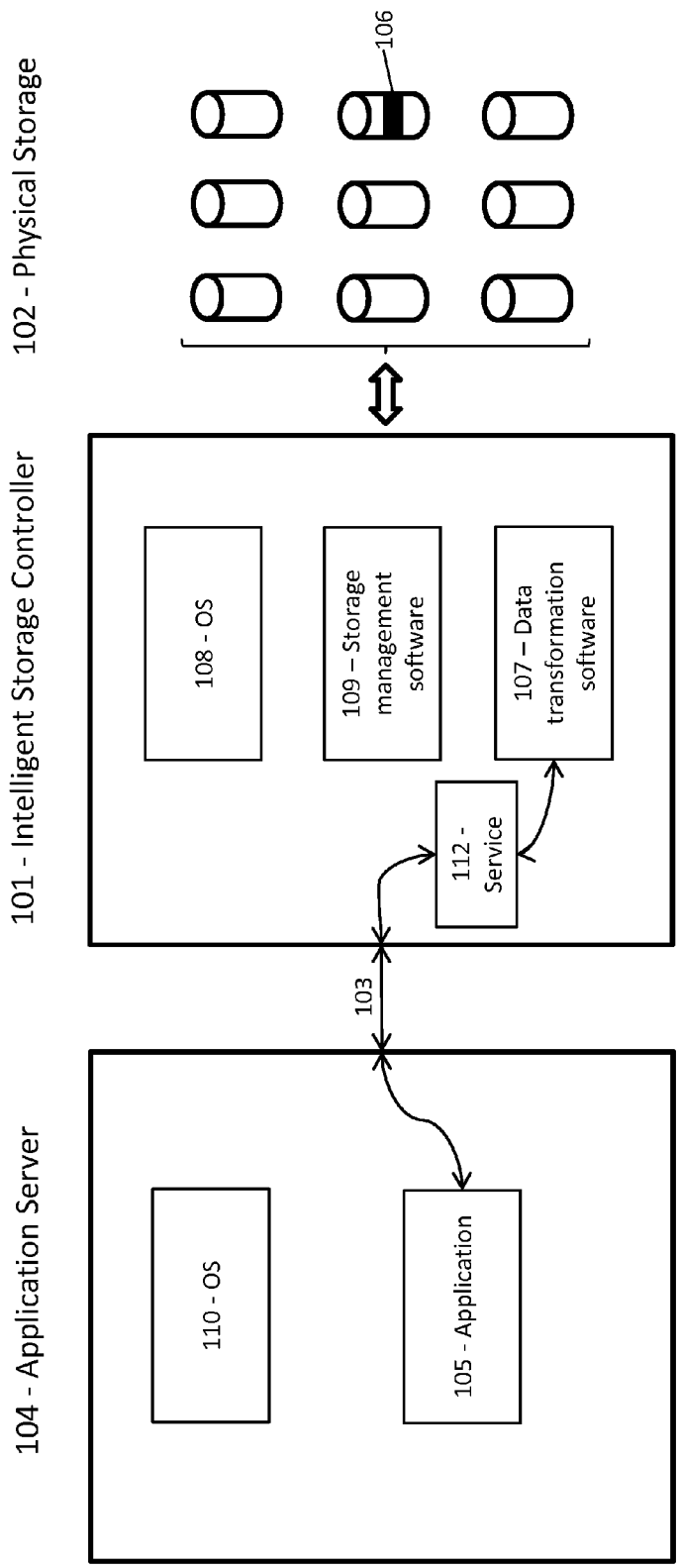
FIG. 1 is block diagram of an intelligent storage controller in accordance with one embodiment, further showing its interconnection with a computer running an application that uses data managed by the intelligent storage controller.

The following detailed description is provided to illustrate the principles of the disclosure by a detailed description of certain illustrative embodiments. The features and attributes selected for purposes of these illustrations should not be understood as limiting the appended claims.

Virtual storage and specialized devices to provide such storage have become widely used in data processing operations. Such devices include equipment knows as storage controllers, file servers, logical volume managers, network attached storage (NAS) devices, storage attached network (SAN) devices, "filers," storage array controllers, virtual tape servers, etc. Such devices are generally referred to herein as "intelligent storage controllers" (ISCs).

ISCs commonly have processors for managing their own local operations and peripherals, as well as upstream communications with the systems to which they provide storage services. ISCs tend to be dedicated devices, and the operating systems that control their processors tend to be embedded OSes. Nevertheless, the processing power on these devices has steadily increased, to the point that currently, in many cases, the power provided internally within an ISC is comparable to that found in general purpose computers.

In data processing operations today, the data to be processed by applications in an enterprise's information systems will often reside on virtual storage managed by a plurality of ISCs.

Conventionally, the computer running any given information processing operation, which shall be referred to as an "application computer" (AC), may treat the data under the control of the ISC in the same way, for application purposes, as data stored locally, such as on one of the AC's own hard disks. The ability to provide remote storage that may be treated as local is one of the principal advantages of an ISC. As mentioned above, an AC performing a data integration (or other data intensive) task may have need at various stages of operation to perform data transformation operations on data under the control of one or more ISCs. Conventionally, in order to perform the data transformation operation, the AC will read the data from storage, perform the data transformation operation, and write the integrated and/or transformed data back to storage.

U.S. Pat. No. 5,519,860 discussed above took advantage of ISCs such as those available at the time to off-load some of the data transformation task, in that case, sorting, from the AC to the ISC. As discussed above, the '860 patent taught to read a sort key and an record storage location for each record to be sorted; sort a "skeleton" containing only the extracted data on the main computer; and then use the sorted record locators and the sort order derived on the main computer to instruct the ISC how to reorder the records. In accordance with this approach, the AC obtained from the ISC a key and a storage location for each record, forming a key-value pair, in which the key was the extracted key, and the value was data representing the original position of the record containing the key, as stored in the external storage device. The ISC was capable of reading, writing and temporarily storing data read from, the managed storage devices. The AC created a sorted index for the external data by sorting the key-value pairs, and then used the results to instruct the ISC how to reorder the data. The volume of data I/O between the AC and the ISC was thereby reduced, and the work involved in rearranging records was off-loaded to the ISC. However, it remained the case that the sort operation was still carried out by the AC and the data I/O, though reduced, was not eliminated, because the keys and record pointers still had to be transferred to the AC from the ISC and the AC still had to transfer back to the ISC the respective record storage locations for the affected records.

It is further possible, given the processing power of modern ISCs, to create and sort the index itself on the ISC, thereby offloading all of the sorting to the ISC and eliminating as well all of the data transfer between the AC and the ISC. Furthermore, in such an approach, it is not necessary any more, as it was in accordance with the '860 patent, to perform a "key sort"; the entire record exists in the storage under the control of the ISC and any suitable sort algorithm can be used. Moreover, the operations that may be performed are not limited to sorting, and may include any data transformation operation.

FIG. 1 illustrates one embodiment in further detail. ISC 101 manages physical storage 102, for example, non-volatile storage such as a disk array. To do this, ISC 101 runs operating system 108 (which may be an embedded OS), and storage management software 109. OS 108 has native storage management capabilities, and storage management software 109 provides further storage management functionality. ISC 101 is connected, for example, by communications connection 103, to AC 104. ISC 101 can serve multiple hosts, and ISC's communications connection 103 may be a network connection, making ISC 101 accessible to other hosts on the network, in addition to AC 104. AC 104 executes application 105, under the AC's operating system 110. Application 105 may be any application that uses data, for example, a data integration application.

During the execution of application 105 on AC 104, it may become necessary to perform a data transformation operation on data residing in physical storage 102 under the control of ISC 101. For example, it may be necessary for purposes of application 105 to sort a file, for example, file 106, residing in physical storage 102. (For simplicity of presentation, I refer herein to "sort," with the understanding that any other data integration/transformation operation or process could be substituted for "sort" to the achieve a corresponding result.)

In the prior art, some or all of the data in file 106 would be read into AC 104 by means of file or block I/O operations directed to ISC 101, and the required sort operation would be performed on AC 104, with the data written back to file 106 itself or another file designated for output (under the control of ISC 101 or otherwise). This might have been done by using a sort routine internal to application 105, or by calling out to a standalone sort program, such as the sort program natively provided by the AC's operating system 110 (e.g., /bin/sort in UNIX® or Linux®), or another program, such as the Sync-Sort® or DMX® programs provided by Syncsort Incorporated of Woodcliff Lake, N.J., the assignee of this application, or other data transformation software. In any of these prior art cases, the sort would be performed on data that had been moved at least in part to the AC, using the processor of the AC.

In the system of FIG. 1, rather than reading and sorting data itself, AC 104 simply directs ISC 101 to perform these operations. In order for ISC 101 to carry out these directions, ISC 101 is provided with software 107 to perform the necessary data transformation operation (in this case sorting), also under operating system 108. Software 107 could be any data integration/transformation software operable under OS 108 and the resources provided by the ISC, for example, an embedded version of SyncSort, on an ISC that runs some variant of UNIX, Linux, Microsoft® Windows®, or other OS supported for SyncSort. Further, the ISC is provided with logic to accept commands to invoke the data integration/transformation software over communications connection 103.

In a preferred embodiment, an application programming interface (API) may be provided for the ISC to accept data transformation instructions from remote hosts (such as AC 104) over communications connection 103, for execution by software 107. In such a case, application 105 on AC 104 may be adapted to use the specified API in order to create appropriate commands and pass them to ISC over communications connection 103, to be performed by ISC 101, for example on file 106 in physical storage 102.

The API provides a structure for the AC to specify the data transformation operations to be performed, and for relaying result and/or error codes back to application 105 on AC 104.

In a further embodiment, a service 112 may be installed on ISC 101 to listen for API commands on a particular network port associated with communications connection 103, with the service configured to pass the commands to software 107. The service may be further configured to pass result and/or error codes back to the sender of the command, formatted in accordance with the API.

AC 104 may of course from time to time also direct data read and write operations to ISC 101 independent of data transformation operations performed in accordance with this disclosure. Thus, AC 104 may access the data in physical storage 102 before or after data transformation operations are performed in accordance with this disclosure (or at any other time). This disclosure presumes that applications may be running in a distributed manner. Accordingly, AC 104 may alternatively direct other machines and processes to obtain data through ISC 101 (including data that has been transformed in accordance with this disclosure), or provide to other machines or processes the file addresses, specifications or offsets for the other machines or processes to perform data transformation operations in accordance with this disclosure.

In another embodiment, ISC 100 and physical storage 102 may comprise a "Virtual Tape Library" (VTL), taking the place of a library of physical tapes as conventionally used in a mainframe computer installation. The VTL controller may be provisioned with a copy of SyncSort executable on the controller's operating system (e.g., Linux), and with a suitable API for invoking SyncSort commands and relaying execution results (such as what might have been provided and returned by SyncSort's own local API). One object of a VTL is to replace legacy tape operations with much faster and reliable disk operations, especially for a multitude of short tapes. The techniques of the present disclosure provides even greater acceleration, not only by eliminating tapes, but by offloading to the ISC all data transformation processing for the selected data, and eliminating all of the data transfer that otherwise would have been required for such processing, on the AC. Contemporary ISC hardware, for example, for VTL applications, typically runs an embedded operating system, such as Linux, uses multi-core processors and has sufficient resources, including memory, such that they may readily be provisioned with data integration/transformation software such as SyncSort.

Figure 2:
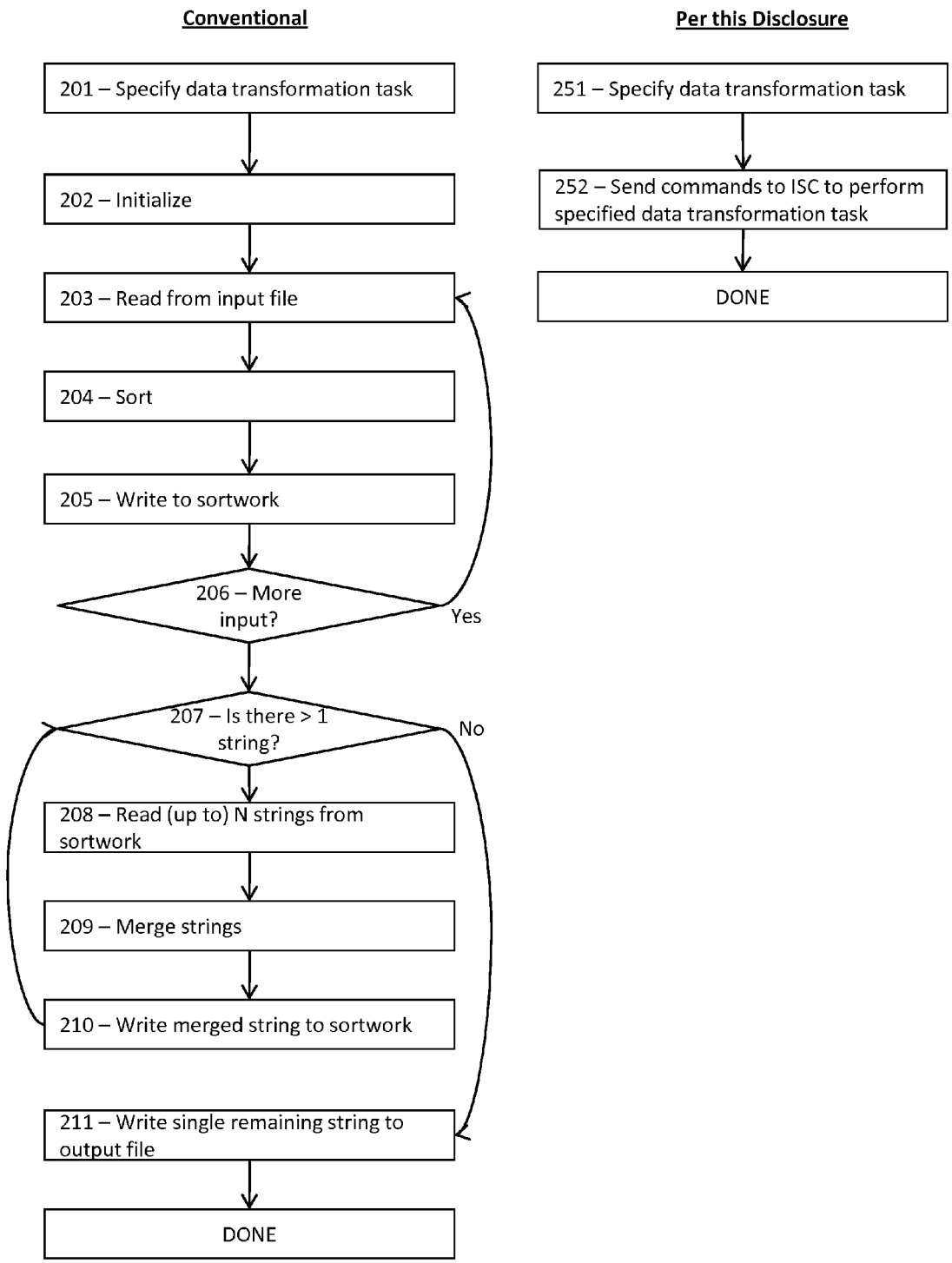
FIG. 2 presents two flow charts, the left-hand one representing steps performed by an application computer to perform a sort operation in a conventional manner and the right-hand one showing the equivalent steps in accordance with this disclosure.

FIG. 2 is a flow chart showing the steps required for a computer running a data integration application (AC) to perform a data transformation operation, in this example, sorting, in support of the data integration application. The left-hand column shows the steps required of the AC under a conventional approach, and the right-hand column shows the equivalent steps in accordance with this disclosure.

The left column of FIG. 2 addresses the example where the data transformation task is a sort and is intended to be exemplary. It is a simplified presentation of one variation of steps involved in an external merge-sort. For further detail and variations, see, e.g., the '961 and '860 patents referred to above.

Briefly, in a conventional approach, as shown on the left side of FIG. 2, AC 104, running a data integration process, will specify in step 201a data transformation operation required to be performed in support of the data integration process. The example of a sort operation is illustrated here as representative of a data transformation operation.

In step 202, AC 104 performs initialization, setting up the sort operation, initializing variables and data structures and planning for the job.

In step 203, AC 104 reads a core load (the amount configured for memory to hold) of data from input file 106, through ISC 101.

In step 204, AC 104 sorts the core load of data using a suitable sort algorithm.

In step 205, AC 104 writes the sorted string to a sortwork file in some media accessible to AC 104 (whether through ISC 101 or otherwise).

In step 206, AC 104 determines if there is more data to sort. If so, processing from step 203 is repeated (i.e., another read, and another sort). If not, processing continues.

In step 207, AC 104 determines if there is more than one string sorted string in sortwork. If so, processing continues to step 208. Otherwise, the processing skips to step 211.

In step 208, AC 104 reads up to n strings (to the extent available) from the sortwork file, where "n" is the power of the merge, i.e., how many strings can be merged at once, as determined by the size of memory and the sort records, and the setup step 202.

In step 209, AC 104 writes the merged string to the sortwork file, and then loops back to step 207 to determine if there remains more than one string in sortwork.

At such time as there remains only one string in sortwork, AC 104 reads this string and writes it to the output file, which may be file 106, or some other file, under the control of ISC 101 or otherwise. Conventional processing is complete.

It is evident that the conventional processing entailed significant processing overhead. It is an O(n log n) comparison-based sorting operation, with a complete read of the input file, repeated reads and writes to and from the sortwork file, and a complete write of the output file.

By contrast, the operations required of AC 104 to perform the equivalent data transformation operation in accordance with this disclosure is shown in the right-hand column of FIG. 2.

As in the conventional example, in step 251, AC 104 will specify the data transformation operation required to be performed in support of the data integration process.

In step 252, AC 104 will call ISC 101 to perform the specified data transformation task, using the API provided by ISC 101. Processing is complete for AC 104.

Of course, equivalent processing to that represented in steps 202-211 on the left side of FIG. 2 is performed by ISC 101. But such processing occurs on ISC 101's own CPU and the related I/O takes place on its own local busses and interfaces, not burdening AC 104 or the data communications network outside of the storage subsystems. This is far preferable, insofar as ISCs such as ISC 101 generally have considerable unutilized processing and data transfer capacity. The use of such capacity relieves application servers such as AC 104 of the entire processing load of the data transformation operations required to perform data integration operations and other data intensive activities requiring substantial data transformation.

Accordingly, an ISC such as ISC 101, with logic built in to perform data transformation operations locally to the ISC on data controlled by it, and with an API so that external devices may call upon this functionality, can be used to achieve considerable acceleration for data integration and other data intensive applications.

Load Balancing

The processing load on ISC 101 will vary from time to time during operation. As noted above, in general it is expected that at most times there will be sufficient processing capacity on this type of equipment to deal with the workload of data transformation tasks. However, there may be times during operation when ISC 101 is facing higher than average demands from data storage and I/O. At such high-demand times, adding to the ISC's workload might adversely impact overall system performance and/or economy.

Such an adverse impact may be avoided by load balancing among ISC 101 and other processors, including AC 104. Under this approach, processing may be less aggressively allocated to ISC 101 when it is determined, based on past and present conditions, that such action will benefit performance and/or economy.

For example, ISC 101 itself, AC 104, or another machine may monitor the loads on ISC 101 and/or the tasks it is performing. It may also maintain a log of such monitoring. The current monitoring data, either alone or in combination with the accumulated data in the log, may be used as a basis for such load balancing.

Some tasks may be performed on ISC 101 on a recurring schedule, which will result in periodic occurrences of higher than average workload on the device. The log data may be used to predict high load conditions based on past patterns. The prediction can be verified by current readings after initially acting on the prediction, and appropriate correction made in real time.

The control outputs of such monitoring may indicate, for example, the volume of the current and/or anticipated workload on ISC 101, and an estimate of how long the workload at that level will continue.

If ISC 101 itself performs such monitoring, it may be adapted to communicate the monitoring information to AC 104 and/or other machines, preferably using an extension of the API discussed above.

If the monitoring of the workload of ISC 101 indicates a need to moderate the load of data transformation processing, a number of options may be exercised. These include, for example, one or more of the following measures:

Determining if a data transformation task that is running or about to be started is not critical to performance of the application that requires it, and if so postponing the task.

Sending no new data transformation tasks to ISC 101 until its workload has eased, and performing the new data transformation tasks on AC 104 or some other available processor.

Reducing the workload of new data transformation tasks by using or reverting to a key sort approach (similar to that of the '860 patent), wherein AC 104 sorts an index to the data and ISC 101 rearranges the content in accordance with the sorted index.

Suspending some or all of the data transformation processing on ISC 101 and shifting the continuing processing to AC 104 or another machine. In the case of a sort, this can be effected by completing any pending in-memory operations and writing the results to storage device(s), communicating the state of the process to the alternate processor, and either having the alternate processor continue processing, treating ISC 101's storage (including any sortwork data in storage) as its own and performing I/O with such storage in a manner supported by ISC 101, or by passing instructions to ISC 101 to reorder data records as determined by the alternate processor, or a combination of these approaches.

Figure 3:
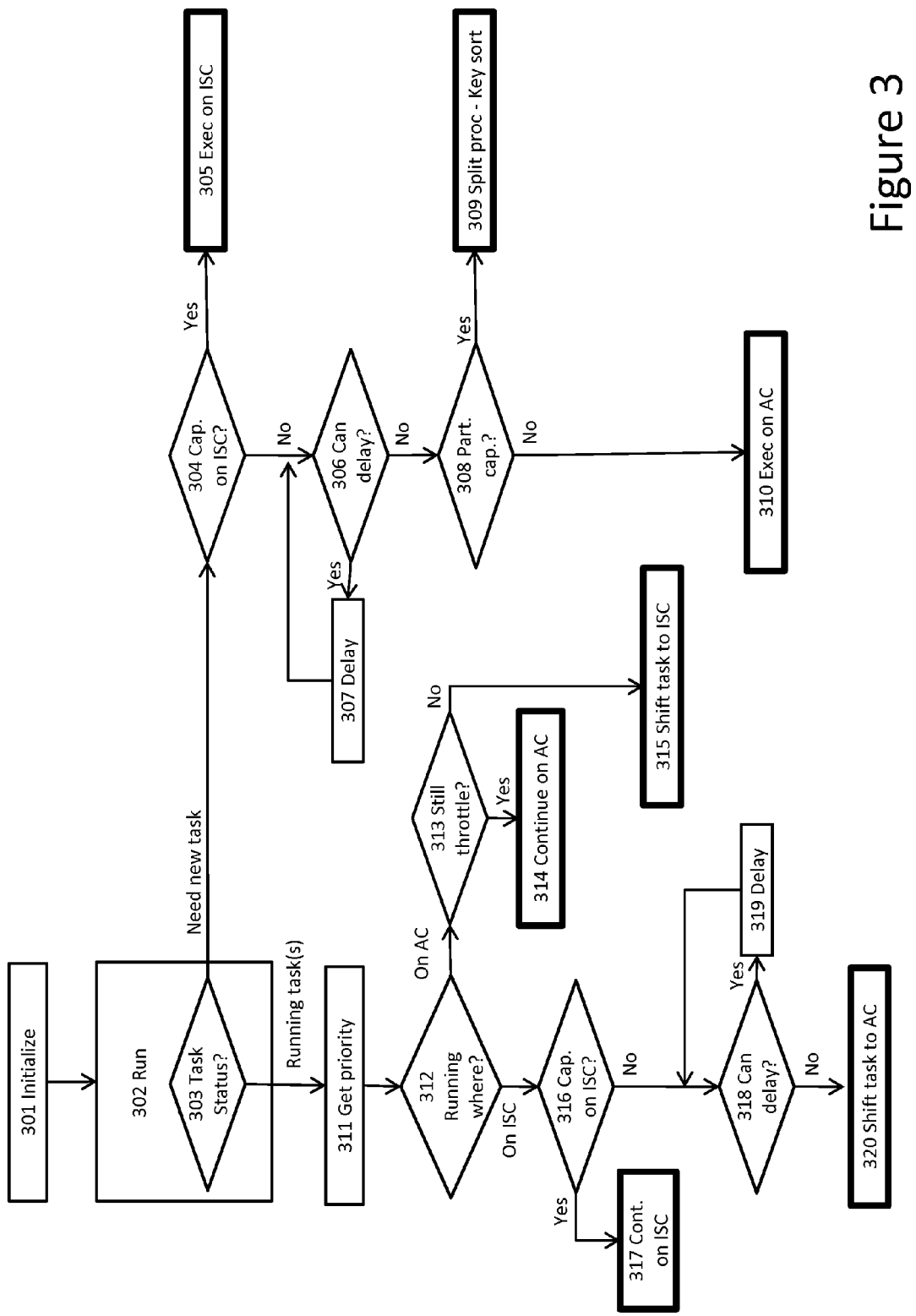
FIG. 3 is a flow chart showing in simplified form the steps performed in one embodiment to perform load balancing between an intelligent storage controller and a computer running an application and/or other hosts.

One implementation of load balancing as described above is shown in FIG. 3. FIG. 3 is a flow chart showing in simplified form the steps performed in one embodiment in order to perform load balancing between an ISC and an AC and/or other hosts.

FIG. 3 is presented based on the load balancing process being run on the AC. However, any or all of the decision steps in that process may be performed on the ISC (or any other processor). In many cases, it will be desirable to run the majority of the decision processing on the ISC itself, using an extension to the task-offloading API discussed above to communicate the appropriate processing instructions to the AC and/or other hosts.

Referring to FIG. 3, step 301 is initialization. In addition to application- or task-specific initialization, this includes initializing and starting a monitoring process as described above, to monitor and log conditions on the ISC. The results of the monitoring provides information on running tasks, as well as an estimate of ISC processing capacity. This information is used, e.g., at steps 303, 304 and 316.

Step 302 represents the Run state of the application requiring the ISC's services (for example a data integration application requiring data transformation services). Within the Run state a process 303 repeatedly checks the status of required data transformation tasks, including both those that are already running, as well as a list or queue of those that need to be started.

If a new data transformation task is needed, the ISC's processing capacity is checked at step 304. If the ISC has sufficient capacity, then in step 305 the task is executed on the ISC.

If there is insufficient capacity on the ISC, then in step 306 it is determined whether the task can be delayed. If so, a delay loop executes (307) until the situation changes (a more detailed implementation would have timeouts, etc.). If the task cannot be delayed, then a check is made at step 308 whether the ISC has capacity for partially performing a task, and if so, a key sort with processing divided between the ISC and the host may be commenced at step 309. If there is insufficient capacity even for partial execution on the ISC, then the task is commenced on the AC at step 310.

If step 303 determines that there are running tasks, the priority of each running task is determined at step 311. The relative priority may be used to allocate available resources or for scheduling, in the case of multiple running tasks.

The steps beginning at 312 are performed for each running task.

At step 312, the task is checked to determine where it is running. If the task is running on the ISC, then the capacity of the ISC is checked at step 316. If the capacity is sufficient, execution of the task continues on the ISC. In a further step not shown in FIG. 3, if this is a situation in which execution of the task has been split between the ISC, and the AC and the ISC has sufficient capacity at that time to perform all of the processing for the task, then the execution of the entire task can be shifted to the ISC.

If there is insufficient capacity to continue the current processing of the task on the ISC without undesired degradation, then it is determined at step 318 if the task can be delayed. If so, then a delay loop (319) (similar to the delay loop at 306) is executed while this is true. If the process cannot be delayed, the task is shifted to the AC in step 320. The following is not shown in FIG. 3, but if conditions permit, the task may be partially shifted to the AC at this point in a manner analogous to that shown in steps 308 and 309.

If step 312 determines that the running task is on the AC, step 313 checks if conditions still require this task to be shifted off the ISC. If so, processing continues on the AC as shown in step 314. If not, the task is shifted to the ISC in step 315. Again, if conditions permit this may be done partially (not shown) by splitting execution in a manner similar to steps 308 and 309.

The steps following the status check on step 303 are performed repeatedly. A "new task" started at steps 305, 309 or 310 becomes a "running task" on subsequent iterations. As tasks are completed, they are no longer included at step 303. Various of the steps as shown will also need tests to determine if tasks are still running or are nonresponsive, etc.

While the preferred embodiment of the invention has been described in detail, variations in fashioning and implementing the systems and methods described herein will be apparent to those of skill in the art, without departing from the scope and spirit of the invention, as defined in the following claims.

I claim:

1. An intelligent storage controller comprising:
    at least one non-volatile physical storage device under the control of the intelligent storage controller;
    an operating system;
    logic to provide storage management for the at least one non-volatile physical storage device;
    a communications connection configured to receive commands from an external device;
    embedded data transformation software to perform one or more data transformation operations on data residing on the at least one non-volatile physical storage device without transferring the data to the external device, the data transformation operations comprising one of data format conversion, data sorting, data summing, data averaging, data sampling, data compression, data decompression, data encoding, or data decoding;
    software installable as a service on the intelligent storage controller to: listen on the communications connection for commands from an external device specifying data transformations to be performed; pass the commands to the data transformation software; and send result codes returned from execution of the commands back to the external device.

2. The intelligent storage controller of claim 1, further comprising an application programming interface for passing the commands and result codes to and from the data transformation software.

3. The intelligent storage controller of claim 1, further comprising a virtual tape library, wherein the intelligent storage controller is adapted as a virtual tape server.

4. A method for a first computer running an application, which application requires a data transformation operation to be performed on data under the control of an intelligent storage controller external to the computer, the data transformation operation being of a type that the intelligent storage controller has been adapted to perform using its own processing resources, comprising the following steps performed by the first computer:
    specifying the data transformation operation required to be performed, the data transformation operation comprising one of data format conversion, data sorting, data summing, data averaging, data sampling, data compression, data decompression, data encoding, or data decoding; and
    sending commands to the intelligent storage controller to perform the specified data transformation operation without transferring the data to the first computer.

5. The method of claim 4, wherein the commands are expressed with application programming interface elements provided by the intelligent storage controller.

* * * * *